(12) United States Patent
Dietel et al.

(10) Patent No.: US 9,772,045 B2
(45) Date of Patent: Sep. 26, 2017

(54) VALVE CARTRIDGE

(71) Applicant: Rausch & Pausch GmbH, Selb (DE)

(72) Inventors: Rainer Dietel, Schwarzenbach (DE); Rocco Kemnitz, Bobenneukirchen (DE); Jakob Haas, Selb (DE)

(73) Assignee: Rausch & Pausch GmbH, Selb (DE)

( * ) Notice: Subject to any disclaimer, the term of this patent is extended or adjusted under 35 U.S.C. 154(b) by 406 days.

(21) Appl. No.: 14/142,322

(22) Filed: Dec. 27, 2013

(65) Prior Publication Data
US 2014/0196797 A1    Jul. 17, 2014

(30) Foreign Application Priority Data
Jan. 16, 2013  (DE) .................. 10 2013 200 533

(51) Int. Cl.
| F16K 31/06 | (2006.01) |
| G05D 16/20 | (2006.01) |
| F16K 27/02 | (2006.01) |
| B60T 8/36 | (2006.01) |

(52) U.S. Cl.
CPC .......... *F16K 31/0662* (2013.01); *B60T 8/363* (2013.01); *B60T 8/367* (2013.01); *B60T 8/3615* (2013.01); *F16K 27/02* (2013.01); *F16K 27/029* (2013.01); *F16K 31/0655* (2013.01); *F16K 31/0658* (2013.01); *F16K 31/0665* (2013.01); *G05D 16/2013* (2013.01); *Y10T 137/0318* (2015.04); *Y10T 137/0491* (2015.04); *Y10T 137/6011* (2015.04); *Y10T 137/7976* (2015.04); *Y10T 137/8085* (2015.04); *Y10T 137/8122* (2015.04)

(58) Field of Classification Search
CPC ........ B60T 8/363; B60T 8/3615; B60T 8/367; F16K 31/0665; F16K 31/0655; F16K 31/0658; F16K 31/0662; F16K 27/029; G05D 16/2013; Y10T 137/8122; Y10T 137/8085; Y10T 137/7976
See application file for complete search history.

(56) References Cited

U.S. PATENT DOCUMENTS

| 5,330,649 | A  | * | 7/1994 | Hafner ................. | F02M 61/165 137/549 |
| 5,615,594 | A  | * | 4/1997 | Duckinghaus .......... | F15B 13/01 137/596.17 |
| 5,651,391 | A  | * | 7/1997 | Connolly ............ | F15B 13/0405 137/454.6 |
| 5,934,766 | A  | * | 8/1999 | Feigel .................. | B60T 8/3635 137/627.5 |
| 2004/0044360 | A1 | * | 3/2004 | Lowe ...................... | A61F 2/013 606/200 |
| 2005/0067028 | A1 | * | 3/2005 | Ryuen ................. | F16K 31/0665 137/596.17 |

(Continued)

*Primary Examiner* — Atif Chaudry
(74) *Attorney, Agent, or Firm* — Maier & Maier, PLLC

(57) ABSTRACT

A valve cartridge for insertion into a valve block for a manifold valve for accommodating a valve in the valve cartridge includes at least one through opening for the passage of fluid flowing to the valve and a filter device for filtering the fluid. The valve cartridge includes a first part and a second part, which are interconnected in such a way that the through opening is formed by the first and second part, the filter device being arranged between the first part and the second part.

14 Claims, 3 Drawing Sheets

(56) References Cited

U.S. PATENT DOCUMENTS

2008/0087854 A1* 4/2008 Voss .................. G05D 16/2013
                                                251/129.01
2010/0111734 A1* 5/2010 Usui .................... F02M 59/366
                                                417/505

* cited by examiner

VALVE CARTRIDGE

RELATED APPLICATIONS

This application claims priority under 35 U.S.C. §119 to German Patent Application No. 10 2013 200 533.4 filed Jan. 16, 2013, the disclosure of which are incorporated by reference herein in its entirety.

FIELD OF THE INVENTION

The present invention relates to a valve cartridge for insertion into a valve block for a manifold valve and for accommodating a valve in the valve cartridge as well as a valve arrangement having such a valve cartridge and a valve. The invention additionally relates to a method for manufacturing the valve cartridge.

BACKGROUND

Hydraulic valves, in particular manifold valves, such as 3/2 directional control valves, are used for example in hydraulic systems of vehicle transmissions as pilot control elements. The valves are respectively inserted into a so-called valve cartridge, which in turn is inserted into a valve block. The valve cartridge has through openings for the passage of fluid, such as a hydraulic oil, flowing to the valve. The through openings are respectively assigned to a particular port of the valve to be inserted into the valve cartridge.

The hydraulic fluid of a hydraulic system of a vehicle transmission may have impurities. For this reason, in the through openings of the valve cartridge, through which the fluid flows into the valve, there is respectively arranged a filter device, for example a strainer, to filter out the impurities, so that these do not get into the valve. A valve cartridge usually consists of an injection-molded plastic part, the strainers being directly molded therein too upon the manufacturing of the valve cartridge by injection-molding. In so doing, the strainers are injection-molded onto the inside diameter of the valve cartridge, because a different arrangement of the strainers would not be possible or only with high effort due to the boundary conditions preset by the injection molds and tools.

The opening cross-section of each of these through openings, however, is diminished by the filter device, so that an undesirable pressure drop occurs. This is particularly critical in particular in the low-temperature range, for example in a range of −40° C. to 0° C., here the hydraulic medium becomes viscous due to the low temperatures. This increases the reaction time in the hydraulic system of the vehicle transmission.

As to avoid this problem or at least reducing it, it is desirable to enlarge the opening cross-sections of the through openings and in particular also those of the strainers. However, an enlargement of the strainer areas at the inside diameter of the valve cartridge is constructively restricted, because the inner construction of the valve cartridge is determined by the valve to be accommodated. A different arrangement of the strainers, namely for example at the greater outside diameter of the valve cartridge, however, cannot be realized by injection molding method, as already mentioned. Other methods for attaching larger strainers, such as for example an adhesive bonding onto the outside circumference of the valve cartridge or also a plugging or snapping of separate strainers onto the valve cartridge are possible, but cause additional effort and increased costs upon the manufacturing of the valve cartridge or are not optimal due to other reasons, for example because of a greater overall volume or lacking stability.

SUMMARY

Hence, it is an object of the present invention to provide a valve cartridge for accommodating a valve, which valve cartridge allows a high flow rate of fluid through the through openings having a filter device.

BRIEF DESCRIPTION OF THE DRAWINGS

Hereinafter, an exemplary embodiment of the invention will be described with reference to the accompanying drawings. Therein are shown.

DETAILED DESCRIPTION

Figure 1:
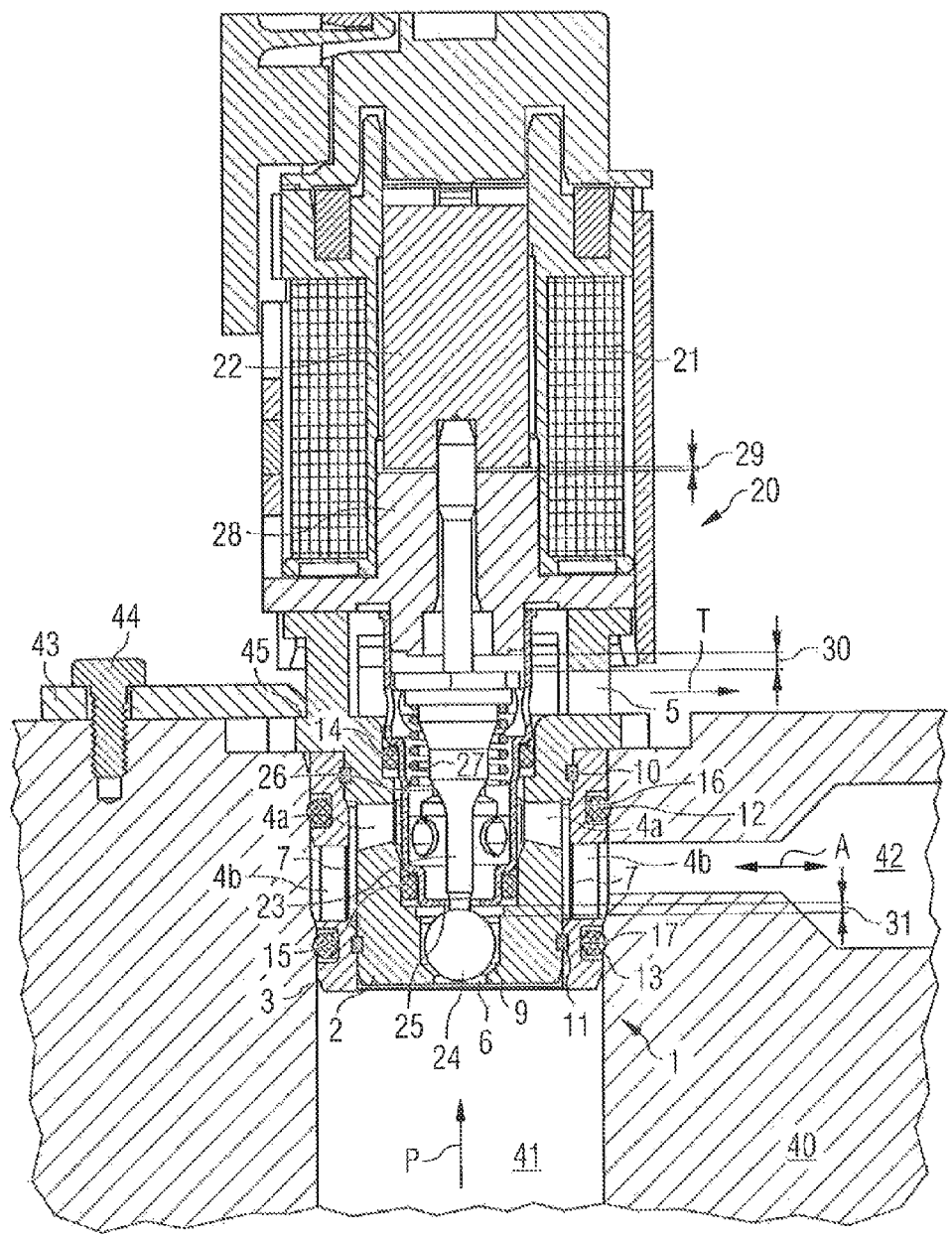
FIG. 1 a valve arrangement having a 3/2 directional control valve and a valve cartridge, inserted in a valve block, FIG. 2a a perspective exploded representation of the valve cartridge of FIG. 1.

According to the invention, the valve cartridge includes a first part and a second part, which are interconnected in such a way that the through opening is formed by the first and second part, the filter device being locally arranged between the two parts, for example clamped, adhesively bonded, welded or injection-molded thereto. In other words, each of the two parts includes openings that upon the assembling of the two parts are aligned such that the through openings of the valve cartridge are formed. In contrast to a one-part construction, the two-part construction allows the valve cartridge to shift the filter devices away from the inside diameter of the valve cartridge in the direction of the exterior circumference of the valve cartridge, so that the area thereof and thus the flow cross-sections of the through openings can be enlarged. In particular, the filter devices, for example strainers, are thus shifted radially outward, thereby their areas being enlarged. A radially further outward position is not subject to the constructive restrictions on the inside diameter of the valve cartridge, which are preset by the valve to be inserted. Simultaneously, the installation space of the valve cartridge is not enlarged, because the outside dimensions can remain unchanged in comparison with known one-part valve cartridges. Thus, even in the low-temperature application range there are achieved pressure drops lower than with known valve cartridges having a one-part construction and smaller strainer areas.

Advantageously, the valve cartridge has a construction, in which the first part is at least partly accommodated in the second part and the filter device is arranged at the second part on a side of the second part, which faces the first part. The first part thus forms a radially interior part and the second part a radially exterior part. The filter device can simply be injection-molded too onto the second part, for example on its inside diameter, upon the manufacturing of the second part by injection molding method, which allows a particularly simple and cost-efficient manufacturing. After the injection molding the two parts are mounted such, that the first part is accommodated in the second part. The filter device now does not lie at the inside diameter of the valve cartridge, but at the inside diameter of the second part of the valve cartridge. Due to this radially further outward position of the filter device, the area thereof is enlarged. Here, the through opening advantageously is a radial through opening.

Independently thereof, some or all the through openings can be provided with flow contours, for example beveled edges, in order to reduce pressure drops.

In an advantageous embodiment of the invention the valve cartridge includes several of the through openings as well as further through openings for the passage of fluid flowing to the valve, which are respectively assigned to a particular port of a valve to be accommodated. The first and second part of the valve cartridge here are interconnected in such a way that through openings that are assigned to different ports of the valve are mutually sealed. Particularly advantageously, the first and second part of the valve cartridge are laser-welded to each other. In this way the two plastic parts can be easily interconnected. In particular, the laser welding can be effected at two radially circumferential seams. By the leakproof welded joint the two parts are simultaneously mutually sealed. In particular, a simple mutual sealing of the through openings of the valve cartridge is effected, the through openings being assigned to different ports of the valve.

The valve cartridge preferably includes at least three through openings and is adapted to accommodate a 3/2 directional control valve. There can be provided a valve arrangement having the described valve cartridge and an electromagnetically actuated valve having at least one port for the passage of fluid, wherein the valve is accommodated in the valve cartridge in such a way that each port of the valve has assigned thereto at least one opening of the valve cartridge. The valve arrangement can be provided in particular for employment in a hydraulic system of a vehicle transmission.

In a method for manufacturing the valve cartridge there is manufactured a first part of the valve cartridge with a first opening and a second part of the valve cartridge with a second opening that is closed with a filter device, preferably by injection molding method. Then the first and second part are interconnected in such a way that the first opening and second opening in the valve cartridge together form a through opening through the first and second part and the filter device is arranged between the first and second part. The connection is preferably effected by means of laser welding, so that a leakproof connection is simultaneously formed. The two parts of the valve cartridge are laser-welded to each other preferably at at least two radially circumferential places. Depending on the number of valve ports to be mutually sealed, it can also be expedient and, where applicable, necessary to provide more than two, for example three or four, circumferential laser-welding seams, in order to reliably separate the corresponding through openings of the valve cartridge from each other.

With a valve cartridge manufactured in such a way the filter devices can be shifted in particular radially outward, and thus the areas thereof can be enlarged, because the filter devices are located between the two parts of the valve cartridge. The manufacturing of the valve cartridge is thus particularly simple and cost-efficient. There can be produced undercuts, which in this form could not be manufactured or only with difficulties in a one part design of the valve cartridge.

In FIG. 1 there is represented a valve arrangement having a valve cartridge 1 and a valve 20 inserted therein. The valve cartridge 1 has a first, radially interior part 2 and a second, radially exterior part 3, which were welded to each other at seams 10, 11 by penetration laser method. The valve arrangement is inserted in a valve block 40, which has a pressure line 41 and a work line 42. The valve arrangement accordingly has a pressure port P and a work port A as well as further a tank port T for discharging hydraulic fluid. The valve 20 in this exemplary embodiment is a 3/2 directional control valve, i.e. the valve 20 has two switching positions for three ports P, A, T. The valve 20 is held in the valve block 40 by means of a clamping device 43 that in turn is fastened with a screw 44 to the valve block 40. The clamping device 43 engages behind the valve cartridge 1 at a flange 45 of the valve cartridge 1.

In a first switching position represented here, the valve seat 25 of the valve 20 is open, so that there is a connection between the pressure line 41 and the work line 42. This switching position is achieved in this exemplary embodiment by energizing the coil 21 of the valve 20, so that the armature 22 is shifted by the generated magnetic force against the force of the spring 27, a remanence gap 29 remaining between the armature 22 and the pole part 28 so as to prevent a magnetic sticking. In this switching position, a ball valve element 24 is lifted by a lift distance 31 from the valve seat 25 of the valve 20 by means of an axially shiftable valve tappet 23, so that the pressure port P is opened. In this position, webs 9 hold the ball valve element 24. Simultaneously, a further valve seat 26 is closed by the resting of a shoulder of the valve element 23, so that the path between the work port A and the tank port T is closed.

In a second switching position, which is not shown, the coil 21 is not energized, so that the valve element 23 is axially shifted by a lift distance 30 by means of the force of the spring 27. The ball valve element 24 is pressed, by the pressure present at the pressure port P, against the valve seat 25 of the valve 20 and closes this. Simultaneously, the valve seat 26 is opened by lifting off the shoulder of the valve element 23, so that the path between the work port A and the tank port T is released. The work line 42 is passed through in the opposite direction, in comparison to the first switching position.

In this exemplary embodiment the second switching position thus arises by switching off the valve 20, the valve element 23 then being urged into the second switching position by the force of the spring 27. It is to be understood, however, that by accordingly reversing the kinematics of the valve 20 the first switching position can be achieved by switching off the valve, the second switching position then being produced by energizing the valve.

The valve 20 is inserted in the two-piece valve cartridge 1, which in turn is inserted in the valve block 40. Two O-rings 14, 15 seal the valve 20 against the valve cartridge 1, with the O-ring 14 sealing the tank port T against the work port A and the O-ring 15 the work port A against the pressure port P. Accordingly, two O-rings 12, 13 seal the valve cartridge 1 against the valve block 40, with the O-ring 12 sealing the tank port T against the work port A and the O-ring 13 the work port A against the pressure port P. The O-rings 12, 13 are arranged in corresponding circumferential grooves 16, 17 of the exterior part 3 of the valve cartridge 1.

The valve cartridge 1 includes, as already mentioned, a first, radially interior part 2 and a second, radially exterior part 3. Strainers 7 close through openings 4 of the valve cartridge 1. The two-part construction of the valve cartridge 1 enables a shifting of the strainers 7 radially outward, because the strainers 7 are arranged in the exterior part 3, more precise on the inside diameter thereof. This allows the area of the strainers 7 to be configured greater than it would be possible when the strainers 7 are arranged on the inside diameter of the interior part 2.

Figure 2A:
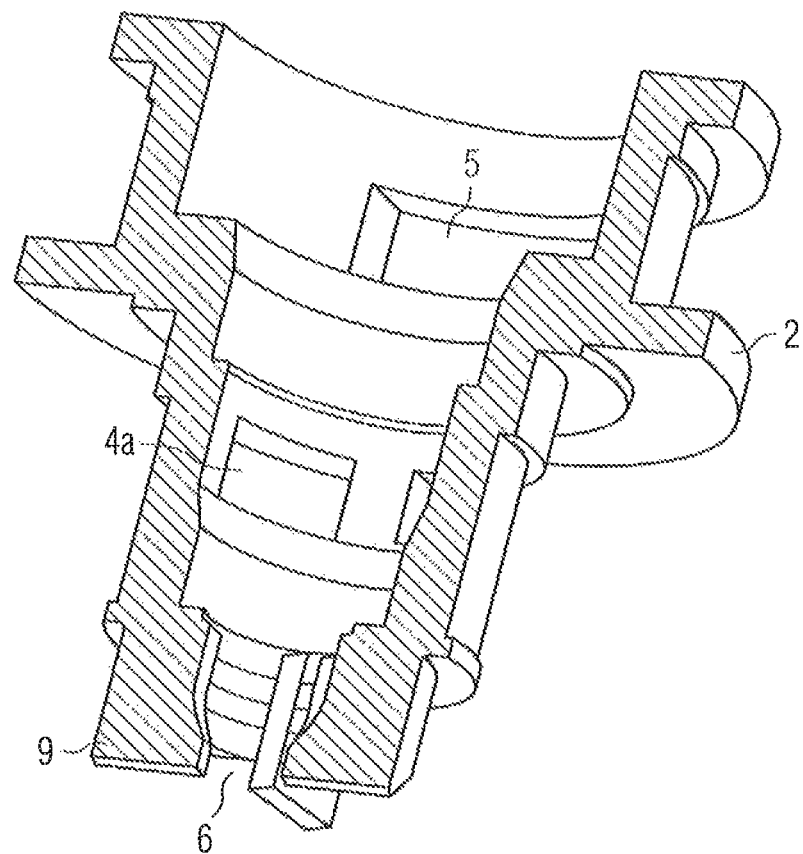
FIG. 2b a perspective sectional representation of the valve cartridge of FIG. 1.
Figure 2A:
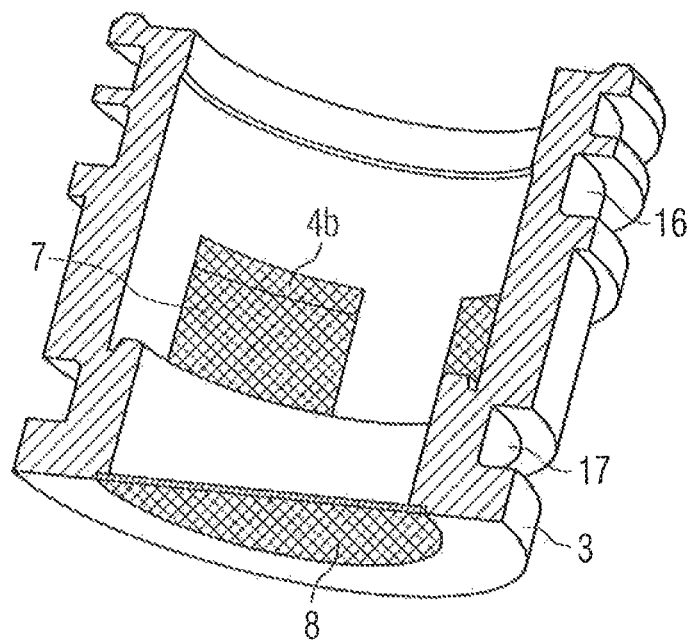
Figure 2B:
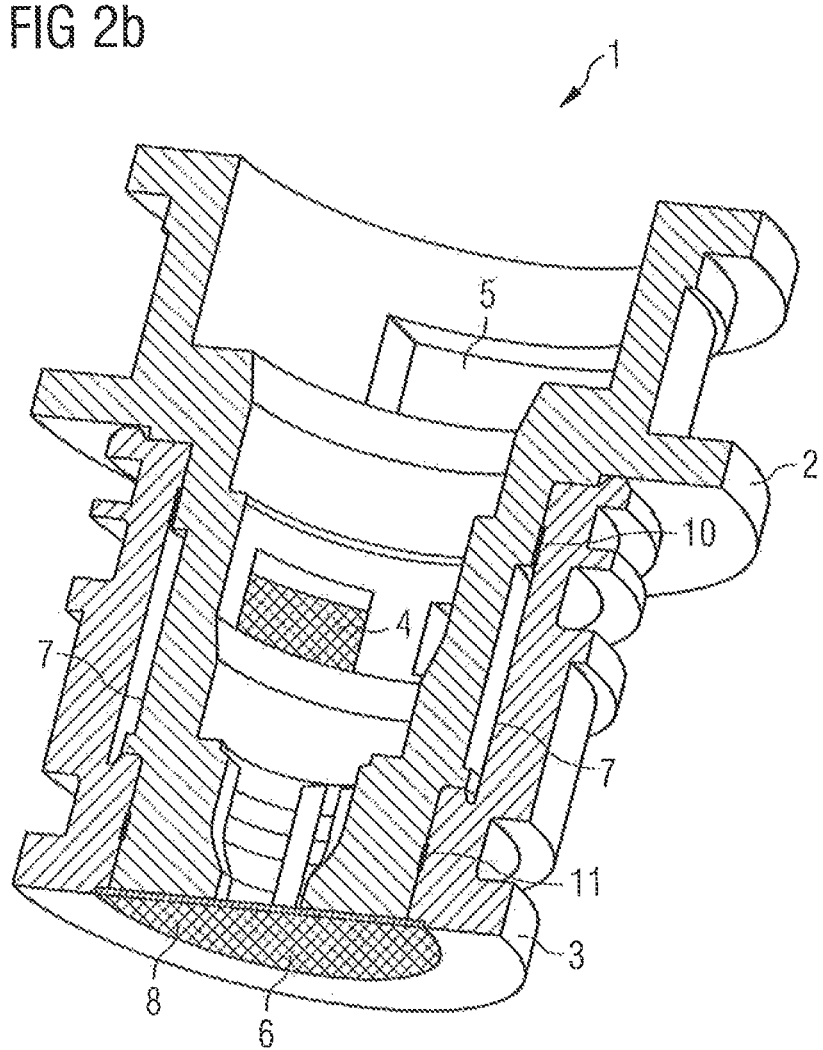

FIGS. 2a and 2b show the two-piece valve cartridge 1 of FIG. 1. FIG. 2a shows the two parts 2, 3 of the valve cartridge 1 in a perspective sectional representation before the assembling. The through openings 4 are assigned to the work port A of the valve 20 and are passed through in two directions. The through openings 4 are formed by accordingly mutually aligned openings 4a, 4b in the first part 2 and the second part 3 and are closed by the strainers 7 that are located on the inside diameter of the exterior part 3 of the valve cartridge 1. The second, exterior part 3 can thus also be referred to as strainer carrier, because it carries the strainers 7 that close the radial through openings 4 of the valve cartridge 1. The arrangement of the strainers 7 on an inside diameter is advantageous for the manufacturing of the parts 2, 3 of the valve cartridge 1 by injection molding method, because the strainers 7 are directly molded therein too.

The through opening 6 of the valve cartridge 1 assigned to the pressure port P is also formed by accordingly mutually aligned openings in the two parts 2, 3 and is also closed by a strainer 8. Through openings 5 of the valve cartridge 1 that merely form the exit to the tank, however, are configured only in the first, interior part 2 of the valve cartridge 1, and they require no filter device, because through them the hydraulic fluid only flows out from the valve 20.

In FIG. 2a it can be seen that the strainer 8 that closes the pressure inlet P is supported by webs 9 of the interior part 2 of the valve cartridge 1. The strainer 8 is arranged at the distal end of the exterior part 3 of the valve cartridge and is injection-molded too, as the other strainers 7, upon the injection-molding. By the provision of the webs 9 a large strainer area 8 can be achieved. Since the strainer 8 is passed through only in the direction toward the valve 20, no support in the counter direction is required.

FIG. 2b shows the valve cartridge 1 in the mounted state in a perspective sectional representation, the first and second part 2, 3 being radially circumferentially laser-welded at two places 10, 11. For this purpose, the radially exterior second part 3 of the valve cartridge 1 is transmissive to a suitable laser radiation, whereas the radially interior first part 2 of the valve cartridge 1 absorbs the same laser radiation and converts it into heat that leads to the welding of the two parts in the contact zone. The two seams 10, 11 are located neighboring the radial through openings 4, which are respectively dosed with a strainer 7 and assigned to the work port A of the valve. This seals the work port A of the valve 20 against the pressure port P and the tank port A of the valve 20.

The strainer area of the strainers 7 that close the through openings 4 of the valve cartridge 1 amounts in this exemplary embodiment to 70 mm$^2$ and has a mesh size of 190 µm. The strainer wire has a diameter of 0.063 mm and consists of stainless steel (for example material 1.4301). The strainer area of the strainer 8 that closes the through opening 6 to the pressure port P amounts in this exemplary embodiment to 58 mm$^2$ with otherwise identical values as the strainers 7.

The invention claimed is:

1. A valve cartridge for insertion into a valve block for a manifold valve, which is adapted to accommodate a valve, wherein the valve cartridge comprises:
    at least one radial through opening, which is arranged in such a way that fluid can flow through the at least one radial through opening to the valve, and furthermore comprises a first filter device, which is adapted to filter the fluid, wherein the valve cartridge comprises a first part and a second part, which are interconnected in such a way that the at least one radial through opening is formed by the first and second part, wherein the first filter device is arranged in the at least one radial through opening between the first part and the second part, wherein the valve cartridge comprises an axial through opening that is formed by the first and second part and has a second filter device, wherein the first part has webs supporting the second filter device.

2. The valve cartridge according to claim 1, wherein the first part is at least partly accommodated in the second part and the first filter device for the at least one radial through opening is arranged in the second part at a side of the second part, which faces the first part.

3. The valve cartridge according to claim 2, wherein the first filter device for the at least one radial through opening in the second part is injection-molded on a side of the second part, which faces the first part.

4. The valve cartridge according to claim 1, wherein the first part and the second part of the valve cartridge are laser-welded to each other.

5. The valve cartridge according to claim 1, wherein the valve cartridge comprises at least three through openings and is adapted to accommodate a 3/2 directional control valve.

6. The valve cartridge according to claim 1, wherein the first and second filter devices comprise a strainer, respectively.

7. The valve cartridge according to claim 1, comprising:
    a valve arrangement having an electromagnetically actuated valve having at least one fluid port, wherein the valve is accommodated in the valve cartridge in such a way that each port of the valve has assigned thereto at least one through opening of the valve cartridge.

8. The valve cartridge according to claim 7, wherein the valve is a 3/2 directional control valve.

9. The valve cartridge according to claim 1, wherein the valve cartridge comprises several of the radial through openings as well as further through openings, which are arranged in such a way that fluid can flow through the through openings to the valve and are respectively assigned to a particular port of a valve to be accommodated, and the first and second part of the valve cartridge are interconnected in such a way that through openings that are assigned to different ports of the valve are mutually sealed.

10. A method for manufacturing a valve cartridge for accommodating a valve, comprising:
    manufacturing a first part of the valve cartridge having a first radial opening and a first axial opening,
    manufacturing a second part of the valve cartridge having a second radial opening and a second axial opening that are closed with a first and a second filter device, respectively,
    connecting the first and second part in such a way that the first and second radial openings in the valve cartridge together form a radial through opening through the first and second part, and the first filter device for the radial through opening is arranged between the first part and the second part and the first and second axial opening together form an axial through opening through the first and second part, wherein the first part has webs supporting the second filter device.

11. The method according to claim 10, wherein the first part and the second part are manufactured by injection molding method.

12. The method according to claim 11, wherein the connection of the first part and of the second part is effected by penetration laser welding method.

13. The method according to claim 12, wherein the first part and the second part are laser-welded to each other at two radially circumferential places.

14. A method for controlling a hydraulic system of a vehicle transmission, comprising:

controlling the hydraulic system with a valve cartridge for insertion in a valve block for a manifold valve, which valve cartridge is adapted to accommodate a valve, wherein the valve cartridge comprises at least one radial through opening, which is arranged in such a way that fluid can flow through the at least one radial through opening to the valve and furthermore comprises a first filter device that is adapted to filter the fluid, wherein the valve cartridge comprises a first part and a second part, which are interconnected in such a way that the at least one radial through opening is formed by the first and second part, wherein the first filter device is arranged in the at least one radial through opening between the first part and the second part, wherein the valve cartridge comprises an axial through opening that is formed by the first part and second part and has a second filter device, wherein the valve cartridge comprises a valve arrangement having an electromagnetically actuated valve having at least one fluid port, wherein the valve is accommodated in the valve cartridge in such a way that each port of the valve has assigned thereto at least one through opening of the valve cartridge, wherein the first part has webs for supporting the second filter device.

\* \* \* \* \*